Feb. 7, 1967  J. BRAZUK  3,302,741
FLUID DRIVE SYSTEM FOR VEHICLES
Filed April 8, 1963  2 Sheets-Sheet 1
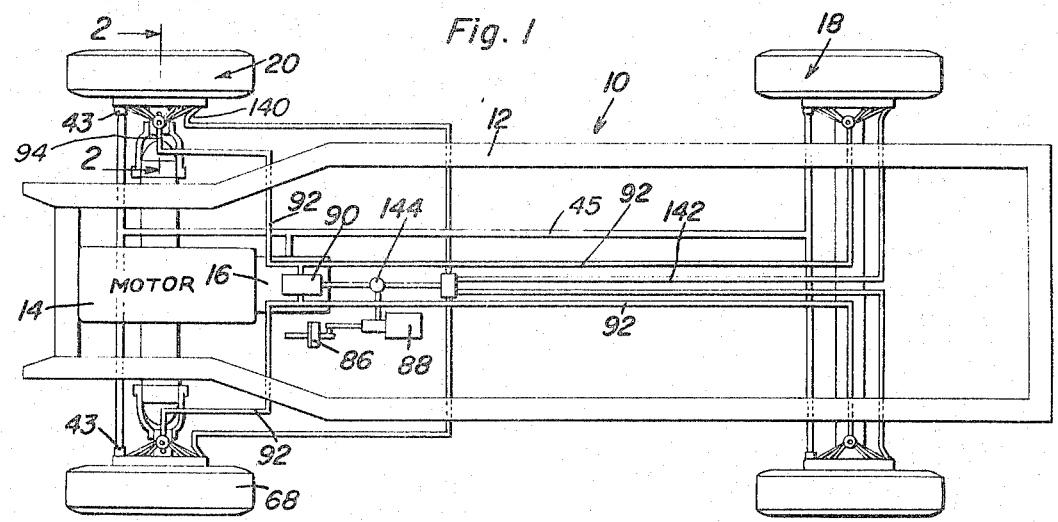
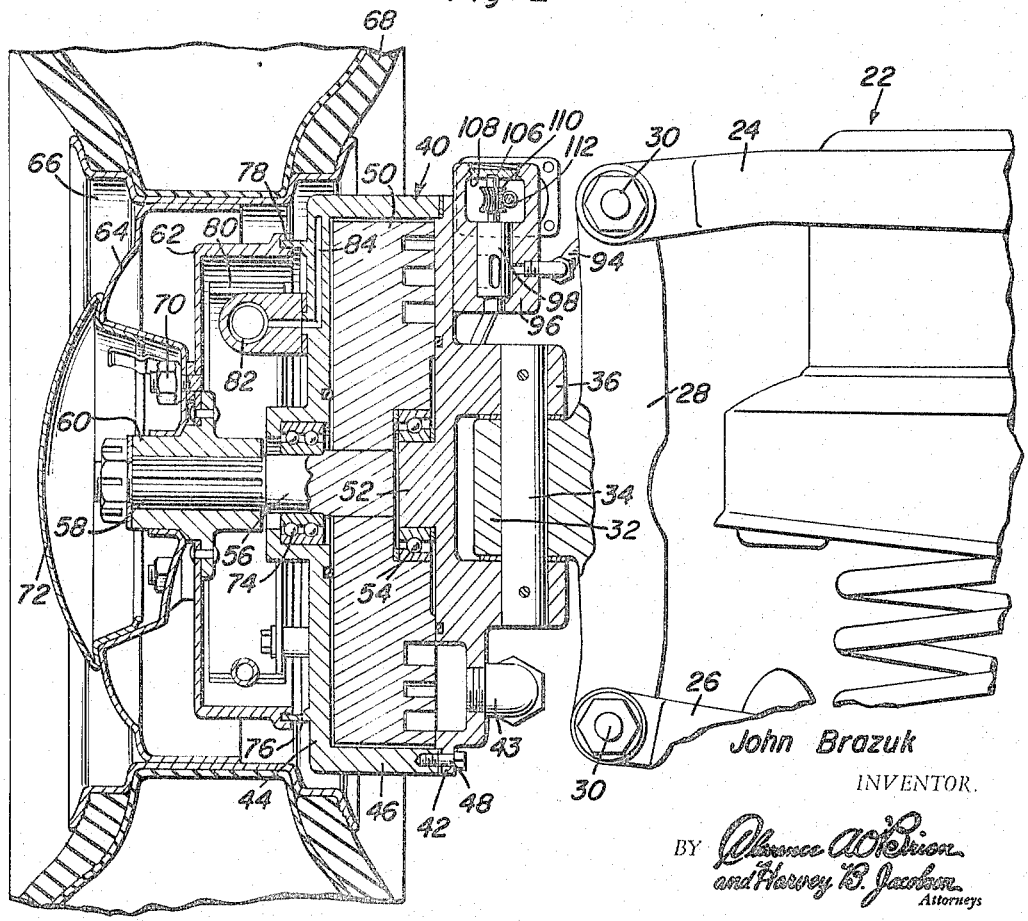
John Brazuk
INVENTOR.

Feb. 7, 1967   J. BRAZUK   3,302,741
FLUID DRIVE SYSTEM FOR VEHICLES
Filed April 8, 1963   2 Sheets-Sheet 2
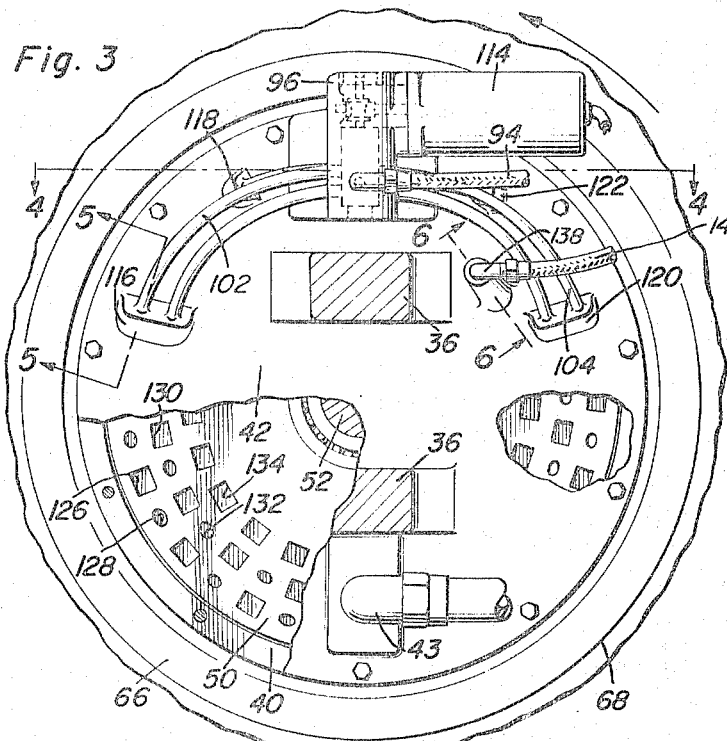
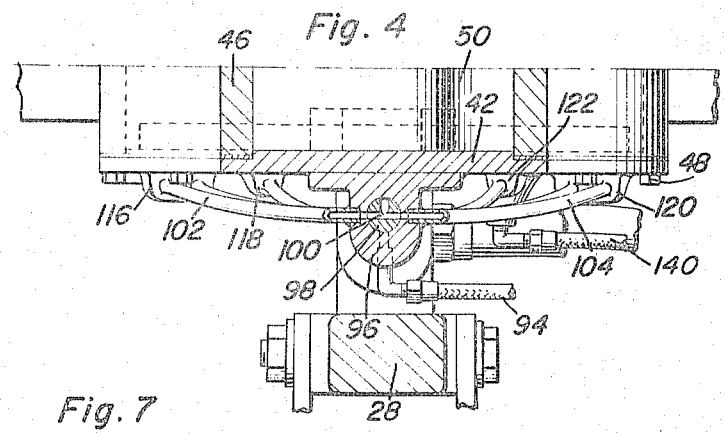
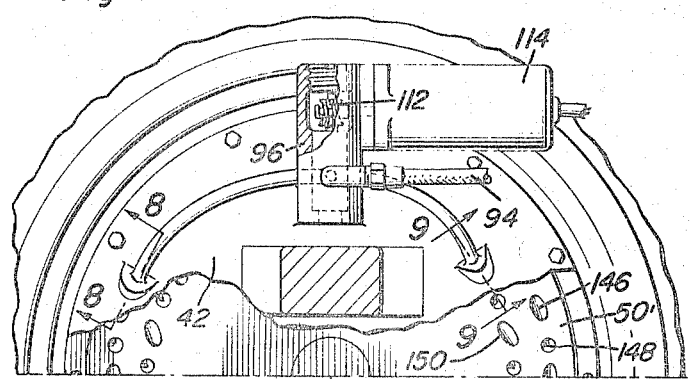
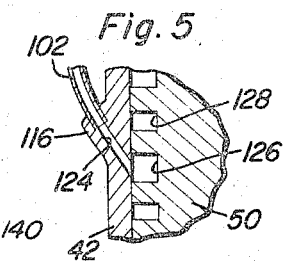
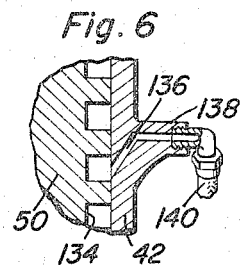
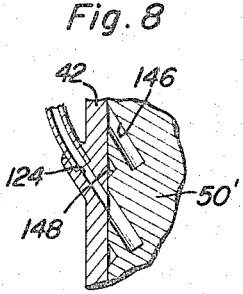
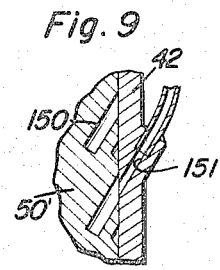
John Brazuk
INVENTOR.

United States Patent Office 3,302,741
Patented Feb. 7, 1967

3,302,741
FLUID DRIVE SYSTEM FOR VEHICLES
John Brazuk, Box 165A, R.F.D. 1,
Green Lane, Pa. 18054
Filed Apr. 8, 1963, Ser. No. 271,115
5 Claims. (Cl. 180—44)

The present invention generally relates to a drive device for a vehicle such as an automobile or the like and more particularly the invention relates to a novel fluid drive system whereby each driven wheel is provided with a fluid motor receiving power from a source of pressurized fluid.

Present day vehicles employ a rather complex drive train in order to interconnect the vehicle engine with the driving wheels thereof. The drive train normally includes various gears, clutches, differential mechanisms, axles and the like thus resulting in a rather complex structure which is subject to considerable wear and failure. Also, conventional drive trains are relatively heavy and add considerable weight to the vehicle. Accordingly, it is a primary object of the present invention to provide a drive system which is quite simplified in that the vehicle engine drives a fluid pump, compressor or the like with each driven wheel being provided with a fluid motor for converting the fluid pressure into rotational movement of the driving force in accordance with a remote control valving mechanism thereby reducing the mechanical components of the drive system, simplifying the drive system thus making it more dependable and reducing the overall weight of the vehicle.

Another object of the present invention is to provide a fluid drive system including a fluid motor at each driven wheel capable of being driven in both a forward and reverse direction and provided with a retarding feature operated automatically in response to application of the conventional vehicle brakes.

Still another object of the present invention is to provide a fluid drive system having a fluid motor at each driven wheel together with individual control mechanisms for each wheel for selectively driving the vehicle with any desired number of wheels thus enabling the vehicle to have all of its wheels driven or only some of its wheels driven depending upon the desires and needs of the operator.

Still another object of the present invention is to provide a fluid drive system including a fluid motor at each driven wheel having a stationary housing mounted rigidly in relation to the backing plate of a conventional friction brake assembly normally provided on vehicles thereby enabling the fluid motor to be rather compactly orientated in relation to the vehicle wheel with conventional suspension assemblies being employed in conjunction with the driven wheels.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a schematic plan view illustrating a vehicle incorporating the fluid drive system of the present invention therein;

FIGURE 2 is a detailed vertical sectional view taken substantially upon a plane passing along section line 2—2 of FIGURE 1 illustrating the details of construction of a driven front wheel;

FIGURE 3 is a side elevational view from the interior of one of the fluid motors with portions thereof broken away for illustrating the construction of the rotor;

FIGURE 4 is a detailed plan sectional view taken substantially upon a plane passing along section line 4—4 of FIGURE 3 illustrating the construction of the control valve for the fluid motor;

FIGURE 5 is a detailed sectional view taken substantially upon a plane passing along section line 5—5 of FIGURE 3 illustrating the orientation of the forward nozzles in relation to the recesses in the rotor;

FIGURE 6 is a detailed sectional view taken substantially upon a plane passing along section line 6—6 of FIGURE 3 illustrating the relationship of the retarding nozzle to the pockets or recesses in the rotor;

FIGURE 7 is a partial elevational view, with portions broken away illustrating a slightly modified form of fluid motor;

FIGURE 8 is a detailed sectional view taken substantially upon a plane passing along section line 8—8 of FIGURE 7 illustrating the orientation of the forward nozzle and the inclined pockets formed in the rotor; and FIGURE 9 is a detailed sectional view taken substantially upon a plane passing along section line 9—9 of FIGURE 7 illustrating the reverse nozzle and its relationship to the inclined pockets formed in the rotor.

Referring now specifically to the drawings, a vehicle is generally designated by numeral 10 and is schematically illustrated as including a frame 12 and a motor 14 located adjacent the forward end thereof. The orientation of the motor 14, of course, may be varied depending upon the construction of the vehicle in that any type of orientation may be employed. The motor 14 drives a fluid pump 16 by any suitable drive connections. The fluid pump 16 may be in the form of an air compressor or a pump depending upon the fluid material being employed. The device may be used with air as a pneumatic system or it may be used with other fluid material. In any event, the pump 16 serves as a source of pressurized fluid and is equipped with suitable bypass valves and the like to enable a predetermined pressure to be maintained.

As illustrated, the vehicle 10 includes rear driving wheels 18 and front steerable driving wheels 20. Hereagain it is pointed out that all four wheels may be driven or only the rear or only the front wheels driven as desired. The wheels 18 and 20 are supported from the vehicle frame 12 in a conventional manner and for purposes of illustration, one of the front steerable wheels 20 is illustrated in detail in FIGURE 2 and includes what is broadly termed an A-frame suspension assembly 22 including an upper control arm 24 and a lower control arm 26 interconnected by a vertical outer arm 28 by pivot members 30. The outer arm 28 is provided with a projection 32 receiving a vertical kingpin 34 which is also received in a pair of spaced projections 36 on a stationary housing generally designated by numeral 40. The housing 40 includes an inner plate 42 integral with the projections 36 and an outer plate 44 having a peripheral cylindrical wall 46 attached to the periphery of the inner plate 42 by a plurality of fastener bolts 48 thus forming a chamber for receiving a generally cylindrical rotor 50. The cylindrical rotor 50 is journaled on a projecting spindle 52 carried by the inner plate 42 by suitable thrust bearing means 54 which not only rotatably journals the rotor 50 but also precludes any axial movement of the rotor 50. The rotor 50 also is provided with a projecting spindle 56 having a splined surface 58 received in a correspondingly splined hub 60 which carries a conventional brake drum 62 and which also supports a wheel 64 having a peripheral rim 66 thereon for receiving an inflated pneumatic tire 68. The wheel 64 is held to the brake drum 62 by conventional lug bolts and nuts 70 and a suitable hub cap or disk 72 is provided to conceal the lug bolts 70.

The spindle 56 is journaled in bearings 74 supported by the outer wall 44 and the outer wall 44 is also provided with a projecting flange 76 received in a groove in the inner edge of the brake drum and designated by numeral 78 thus forming a weather seal to prevent entry of water, dirt and the like from the interior of the brake drum. Conventional brake shoes 80 are mounted on the external surface of the wall 44 and are actuated by hydraulic fluid piston and cylinder assemblies 82 in a conventional manner which are communicated with a hose leading to a hydraulic brake master cylinder by virtue of a passage 84. The details of the hydraulic brake hoses and master cylinder assembly are not illustrated but the brake pedal is designated by numeral 86 and the master cylinder is designated by numeral 88. This portion of the brake structure is conventional insofar as operation of the brake shoes 80 is concerned.

The fluid pressure leaves the pump 16 and enters a distributing manifold or control 90 from which it is discharged into a plurality of supply lines 92 having segments thereof in the form of flexible hoses 94 extending into a valve body 96 having a rotatable valve member 98 disposed therein and having substantially a T-shaped passageway 100 for controlling flow of fluid pressure into forwardly extending tubes 102 or rearwardly extending tubes 104. The tubes 102 and 104 are of the same size and may be in the form of pipes or conduits or may be in the form of passages. The valve body 98 is provided with a shaft 106 which extends longitudinally thereof through a hollow casing 108. The shaft 106 is provided with a worm gear 110 thereon in meshing engagement with a worm drive gear 112 driven by an electric motor 114. The electric motor 114 is controlled from a remote position such as from the dash by a suitable push button assembly whereby when the push button is in a forward position, the valve body 98 will be rotated so that the fluid pressure entering through the hose 94 will pass into the forwardly extending tubes or pipes 102. Correspondingly, when the reverse push button is depressed, a suitable electrical circuit will be energized to move the valve body 98 to a position so that fluid pressure will be introduced into the rearwardly extending pipes or tubes 104. In a neutral position, the fluid pressure will either be introduced to both sets of pipes or tubes or not be introduced to either set of pipes or tubes.

As illustrated, there are three pipes 102 and three pipes 104. Two of the pipes 102 enter a fitting or housing 116 while the third pipe or tube 102 is shorter and enters a housing 118. Correspondingly, two of the rearwardly extending tubes 104 enter a housing or fitting 120 while the shorter tube enters a fitting 122. Each of the fittings 116, 118, 120 and 122 includes an inclined discharge nozzle 124 with the forward nozzles being illustrated in FIGURE 5 and inclined in the direction of normal rotation for forward movement as illustrated by the arrow in FIGURE 3 so that as pressurized fluid is introduced through the nozzle 124, the rotor 50 will be caused to rotate in a rotational direction for propelling the vehicle forwardly. Conversely, the rear fittings also have nozzles inclined in a rearward manner so that when fluid pressure is introduced through the rear nozzles, the rotor 50 will be rotated in a manner for moving the vehicle rearwardly.

The rotor 50 includes an outer row of circumferentially arranged pockets or recesses 126 which are generally rectangular in configuration and alternating pockets 128 of cylindrical or circular configuration. An intermediate row of rectangular pockets 130 is provided with alternating pockets in this row being cylindrical as designated by numeral 132. An inner row of rectangular pockets 134 is provided. The rows of pockets are circumferential and spaced radial as illustrated in FIGURE 3. The two outer rows of pockets are of the forward and reverse drive pockets and are in registry with the nozzles 124 which communicate with the tubes 102 and 104 respectively for driving the vehicle wheels 18 and 20 in a forward or reverse manner.

The inner row of pockets 134 communicates with an inclined nozzle 136 formed in a fitting 138 having a fluid pressure hose 140 communicated therewith. The fluid pressure hose is communicated with a conduit 142 having a control valve 144 operated from the hydraulic brake master cylinder in such a manner that the valve 144 will be opened when the vehicle brake pedal 86 is depressed thereby admitting fluid pressure through the hose 140 into the nozzles 136 for introducing a retarding force to the vehicle when it is traveling forwardly thus serving to save wear on the conventional brake shoes 80.

FIGURES 7–9 illustrate a slightly modified form of the invention in which the rotor 50' is provided with inclined pockets 146 and 148 alignable with a forward nozzle or nozzles 124. An inner row of inclined pockets 150 is provided in the rotor 50' and registers with rearwardly inclined nozzle 151 for either driving the vehicle wheel forwardly or reversely with the rear driving nozzle and pocket assembly being employed to retard the vehicle during forward movement and correspondingly, the forward pockets being used to retard the vehicle when moving rearwardly or the conventional brake shoes may be employed for controlling movement of the vehicle. All other structural details of the form of the invention illustrated in FIGURES 7–9 are the same as the device illustrated in FIGURES 1–6. The particular angular inclination of the pockets and the depth of the pockets in the rotor may vary depending upon the power requirements of the particular vehicle. Also, the specific shape and size of the pockets may vary in relation to the requirements of the vehicle and also in relation to the particular fluid being employed.

The fluid drive system of the present invention may be operated by using any suitable fluid material capable of being pumped and being controlled by pressure relief bypass valves and other valves for selectively introducing pressurized fluid into the forward nozzles or into the rear nozzles for correspondingly driving the wheels. The retarding nozzle is employed and connected with the master cylinder of the conventional hydraulic brake system of a vehicle so that when the brake pedal is depressed, the fluid pressure will be automatically communicated with the retarding nozzle. This may be accomplished by a valve in the braking fluid line operative in response to pressure increase in the master cylinder such as occurs when the brake pedal is depressed. This retarding action of the retarding nozzle will reduce the wear on the conventional brake shoes thereby prolonging the life thereof.

The lower portion of the housing is provided with an enlarged discharge adapter 43 formed in the plate 42 and connected to a suitable return line 45 for returning pressure fluid back to the pump mechanism. In each row of pockets in the rotor 50, the pressurized fluid impinging upon the pockets in an angular direction will cause rotation of the rotor due to the kinetic energy in the pressurized fluid. Further, movement of the gases between the high pressure area at the nozzles towards the low pressure area at the exhaust will frictionally drag the rotor with the moving fluid in a conventional and well known manner. While the structure of the rotor and housing has been illustrated in fluid-tight relationship, actually, there may be provided suitable clearance between the two components in order to enable expansion and passage of the pressurized fluid during the working cycle.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A fluid drive system for a vehicle having groundengaging wheels and conventional brake shoes incorporated therein, said system including a fluid drive motor connected with each of the driving wheels, a prime mover, pump means driven by the prime mover for producing pressurized fluid, means communicating the pressurized fluid to the drive motors for driving the drive wheels, each fluid motor including a fluid pressure operated retarding means, and foot pedal means for operating the conventional brake shoes and automatically operating the retarding means of the fluid motor when the vehicle is moving forwardly thereby assisting in slowing the vehicle for reducing the wear on the conventional brake shoes.

2. The structure as defined in claim 1 wherein said fluid motor includes a housing, a rotor disposed in said housing, a plurality of peripheral rows of pockets disposed in at least one side wall of the rotor, a plurality of forwardly inclined nozzles in said housing for communicating with certain of the rows of pockets, a plurality of rearwardly inclined nozzles in said housing communicating with the same rows of nozzles, and valve means selectively communicating pressurized fluid with the nozzles for driving the drive wheels selectively forwardly or rearwardly.

3. The structure as defined in claim 2 wherein said fluid pressure operating retarding means includes a peripheral row of pockets having a retarding nozzle inclined rearwardly communicated therewith for retarding rotation of the rotor when the vehicle brakes are applied.

4. The structure as defined in claim 3 wherein said housing is disposed inwardly of the brake shoes with the outer wall of the housing forming a backing plate for the brake shoes, said rotor being provided with a spindle attached to the hub of a vehicle wheel for driving the vehicle wheel in response to rotation of the rotor.

5. The structure as defined in claim 4 wherein said pockets in the rotor are inclined.

References Cited by the Examiner
UNITED STATES PATENTS

| | | | |
|---|---|---|---|
| 650,847 | 6/1900 | Libbey | 188—90 X |
| 800,684 | 10/1905 | Schneider. | |
| 1,987,698 | 1/1935 | Montelius | 180—66 X |
| 1,992,912 | 2/1935 | De la Mater | 188—90 X |
| 2,279,008 | 4/1942 | Nathan. | |
| 2,335,544 | 11/1943 | Schnetzer. | |
| 2,394,160 | 2/1946 | Emmitt | 180—66 X |
| 2,694,982 | 11/1954 | Quartullo et al. | 180—66 X |
| 3,142,361 | 7/1964 | Kelemen | 188—86 |

OTHER REFERENCES

Publication: "The American Inventor," April 1906, vol. 15, November 4, page 101.

A. HARRY LEVY, *Primary Examiner.*